(12) United States Patent
Smallridge

(10) Patent No.: US 10,363,669 B2
(45) Date of Patent: Jul. 30, 2019

(54) ANATOMICAL ROBOT

(71) Applicant: Brad Smallridge, San Francisco, CA (US)

(72) Inventor: Brad Smallridge, San Francisco, CA (US)

( * ) Notice: Subject to any disclaimer, the term of this patent is extended or adjusted under 35 U.S.C. 154(b) by 1038 days.

(21) Appl. No.: 14/854,217

(22) Filed: Sep. 15, 2015

(65) Prior Publication Data

US 2017/0072574 A1     Mar. 16, 2017

(51) Int. Cl.
  *B25J 17/02*     (2006.01)
  *B25J 15/00*     (2006.01)
  *B25J 18/04*     (2006.01)

(52) U.S. Cl.
  CPC ....... *B25J 17/0275* (2013.01); *B25J 15/0009* (2013.01); *B25J 18/04* (2013.01)

(58) Field of Classification Search
  CPC .. A61F 2/586; A61F 2002/6827; A61F 2/583; A61F 2/585; A61F 2002/587; A61H 1/0288; B25J 15/0009; B25J 17/0275; B25J 18/04; B25J 17/025; B25J 17/0291; B25J 18/00; B25J 18/007
  USPC ....... 623/21.15, 21.16, 21.17, 23.43, 57, 61, 623/62, 63; 294/111; 414/680
  See application file for complete search history.

(56) References Cited

U.S. PATENT DOCUMENTS

| | | | |
|---|---|---|---|
| 2,500,614 A | | 1/1948 | Lohmann |
| 2,464,577 A | * | 3/1949 | Hobbs ..................... A61F 2/583 623/63 |
| 3,188,753 A | * | 6/1965 | Lovercheck ............ A63H 3/18 434/274 |
| 4,815,911 A | | 3/1989 | Bengtsson et al. |
| 5,092,646 A | * | 3/1992 | Smallridge .............. B25J 9/104 254/278 |
| 5,447,403 A | * | 9/1995 | Engler, Jr. ........... B25J 15/0009 294/111 |
| 8,322,250 B2 | | 12/2012 | Kim et al. |
| 8,511,964 B2 | | 8/2013 | Linn et al. |
| 8,606,398 B2 | | 12/2013 | Eakins et al. |
| 8,833,827 B2 | * | 9/2014 | Ciocarlie ................. B25J 15/08 294/111 |
| 2013/0131815 A1 | * | 5/2013 | Starkey ................... A61F 2/583 623/18.11 |
| 2015/0351935 A1 | * | 12/2015 | Donati .................... A61F 2/586 623/25 |
| 2016/0361814 A1 | * | 12/2016 | Beevers .............. B25J 15/0009 |

* cited by examiner

Primary Examiner — William V Gilbert

(57) ABSTRACT

A robot having anatomical robot joints with convex surfaces significantly less in average overall curvature than their corresponding concave surfaces; having single lobe, double lobe, or saddle shapes; and held together by flexible bands that allow rocking, slipping, and twisting types of motion.

6 Claims, 12 Drawing Sheets

ANATOMICAL ROBOT

CROSS-REFERENCE TO RELATED APPLICATIONS

Not applicable.

FEDERALLY SPONSORED RESEARCH OR DEVELOPMENT

Not applicable.

BACKGROUND OF THE INVENTION

1. Field of the Invention

This invention relates to the field of robotics. There are many types of robots. Some remote control or autonomous boats, submarines, vehicles, aircraft, or missiles are considered robots. Some computer numerically controlled automated mills, lathes, or other machinery are considered robots. And sometimes a simple non-moving electronic device, modem, computer, or data server is called a robot. This invention is specifically about robots, either whole or part of a whole, that have at least one articulated joint, including, but not limited to, SCARA robots, Stewart platforms, pick-and-place robots, animatronic robots, legged robots, armed robots, anthropomorphic robots, animal robots, fish robots, insect robots, motion controlled camera jibs and cranes, space exploration robots, firefighting robots, toy robots, military robots, industrial robots, welding robots, painting robots, prosthetics, exoskeleton robots, crash dummies, medical robots, anatomical models, stunt doubles, and ballistics targets.

2. Description of the Prior Art

The majority of articulated motion in robots is designed with revolute joints. A revolute joint has a single axis. The moving structures in a robot with revolute joints are held together with an axle or a pin in such a way as to allow for one part to move relative to another part about a single axis. The engineering of such revolute joints can be highly precise, low friction, easily measured with sensors, well understood, and easy to model computationally. Joints with bearings, when affordable, help reduce friction, but the resulting motion, about a single axis, is essentially the same, and are also revolute joints.

Many complex motions done by a human body, such as the motions of the shoulder, are typically deconstructed into an arrangement of three or more revolute joints with orthogonal axes, such as the shoulder in U.S. Pat. No. 8,322,250 (Kim).

Although revolute joints prevail, there are a few alternatives. U.S. Pat. No. 4,815,911 (Bengtsson) describes a robotic arm comprising pinless joints having contact surfaces held together by spring-like harnesses. The surfaces are frictionally engaged and roll upon one another without slippage.

In U.S. Pat. No. 2,500,614 (Lohmann) an artificial hand is described that uses spherical shapes rather than an axle or pin as part of the articulating fingers.

Compliancy in the motion of a robot is important. U.S. Pat. No. 8,606,398 (Eakins), for example, introduces compliancy into a robotic manipulator by adjusting the pressure of a balloon that couples the arm to the gripper.

Most robots designed to mimic the appearance and or motion of a human are inspired by an elementary external survey of human body parts. Thumb, fingers, palm, wrist, forearm, elbow, upper arm, shoulder, torso, legs, feet are the typical elements of these inventions. U.S. Pat. No. 8,511,964 (Linn) outlines these body parts in the claims, with an additional shrug element.

BRIEF SUMMARY OF THE INVENTION

This invention uses anatomical robot joints. Anatomical robot joints have no pin or axle, have a motion that incorporates rocking, slipping, and twisting, and are not revolute joints. These novel anatomical robot joints offer many overlooked advantages.

It is one objective of this invention to introduce anatomical robot joint as a fundamental part for designing and constructing an anatomical robot.

Another objective of this invention is to provide a new and novel approach to the design of anatomical robots. Over-simplistic conventional designs usually result in limited range, awkward motions, or other disadvantages. For example, the palm of a human is not an inflexible shell. The bones inside a human palm, carpals and metacarpals, give the human palm a degree of flexibility useful for grasping many hand tools as well as a variety of other functions. To model the human palm with an inflexible shell, which is done in the majority of anthropomorphic robot designs, sacrifices a great deal of manipulation functionality.

Although this invention describes the human form as one preferred embodiment, it is not the intention that this invention be limited in any way to the exact form of a human body. In fact, the form is more a function of what the designer wants a robot to accomplish. If a robot designer wants to detect marine mines, for example, or any other kind of marine activity, a dolphin or fish form may be more desirable to imitate. The design may not necessarily imitate any creature. Even within the boundaries of the human form, the designer is free to engage in variation of size and shape, even those that might be considered well beyond human form. And, finally, any sort of mix of anatomical robot joints with conventional joints is also not limiting.

But if human form is followed, there are certain advantages that could be useful. An exact anatomical robot, for one example that should not be considered limiting, can be used in the medical field in place of cadavers. This offers the advantages of an ample supply of inexpensive artificial subjects, no smells or toxicity associated with embalming fluids or the thawing of frozen body parts, no predominance of older, frail, or sickly subjects, no lack of cadavers and no rigor mortis. Additionally, certain features of the anatomical robot, could be highlighted with colors, or embossed labels, for instructive purposes.

A robot built with human form also has advantages of performing tasks more like a human would perform tasks. If each motion of an anatomical robot is fundamentally the same as human motion, there is no human motion that the anatomical robot cannot do. The reengineering of work environment, motion planning, protective clothing, and tooling is eliminated.

Another objective of this invention is to fundamentally change the mindset of robot designers to move them away from the conventional reengineering of the robot with conventional mechanical devices and turn their attention to the details of the actual internal workings of human anatomy.

DETAILED DESCRIPTION

An important and defining part of an anatomical robot are the anatomical robot joints. Analogous to biological joints that connect and allow bones to move, anatomical robot joints allow movement of the structures of an anatomical robot. There are two important components to any one anatomical robot joint, the contacting surfaces between two structures and the flexible bands that hold the two surfaces together. Flexible bands couple two structures together but still allow motion of one structure relative the other structure.

Also important to an anatomical robot joint is that when two contacting surfaces are coupled together, one surface is a concave shape and the other surface is a convex shape. The two surfaces are further defined as single lobe, double lobe, or saddle shaped.

There are three basic types of motion, as defined in this invention, that can occur in an anatomical robot joint. These types of motion are rocking, slipping, and twisting. Rocking type of motion is a rotation about a contact point or area. As with a household rocking chair, the instantaneous motion is one of rotation around a point of contact of the rungs on the floor. This point of contact moves along the floor as the chair rocks. Slipping type of motion is when an area of contact of one surface slides over an area of contact of another surface. As with a sled going down a snowy hill, the points of contact of one surface are constantly changing relative the points of contacts with the other surface. Twisting type of motion is a rotation orthogonal to the contact areas. As with a top spinning on a pedestal, the point of contact is constant, and the motion occurs around an axis that includes that point of contact.

To be clear, "type of motion" is not the same as "axis of rotation" or "degree of freedom" that are used in the usual robotic or mechanical lexicon. The meaning of rocking and slipping types of motion is clarified in the detailed description of the first four figures and twisting type of motion in the fifth figure.

Figure 1:
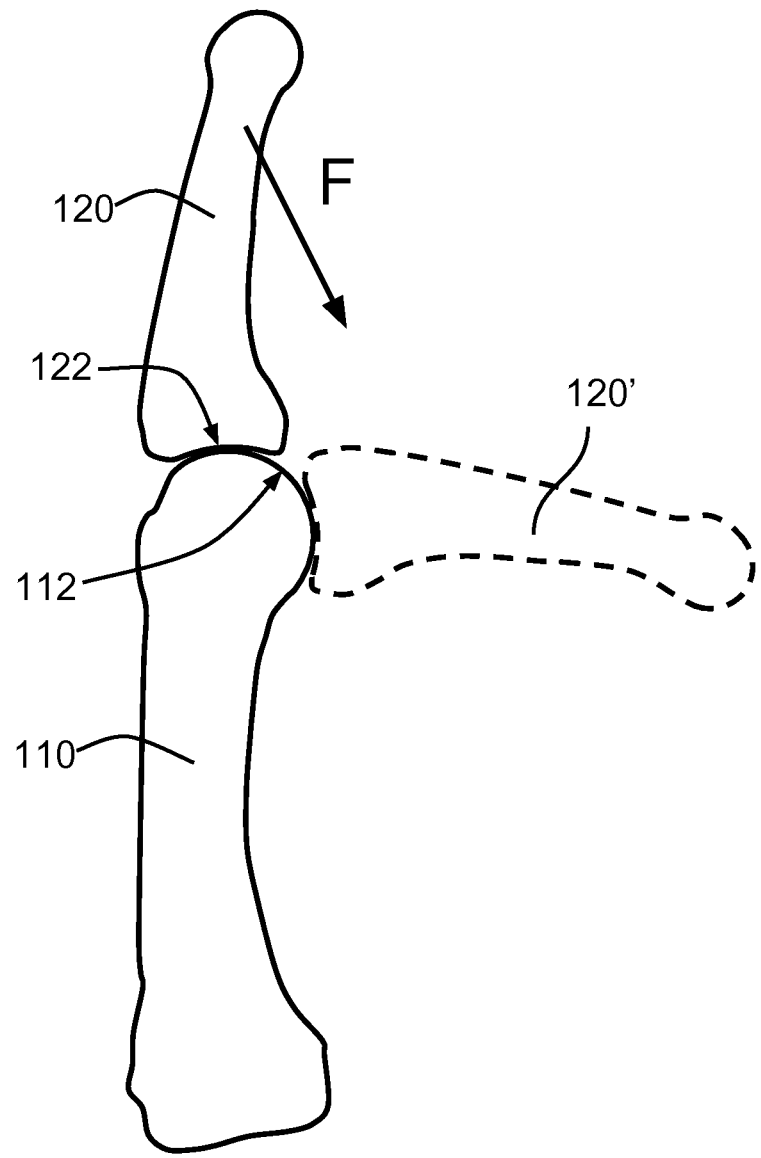
FIG. 1 is a view of a single lobe joint showing two positions.

FIG. 1 shows a cross sectional view of one embodiment of an anatomical robot joint. This is a single lobe anatomical robot joint having a structure 110 with a convex surface 112, which is approximately ball, knob, or lobe shaped at one end. The other structure 120 has a concave surface 122 which receives the convex surface 112. The convex surface 112 of structure 110 contacts the concave surface 122 of structure 120. Flexible bands (not shown) hold the convex surface 112 in contact with the concave surface 122 while allowing relative motion between the two structures.

When a force is applied to structure 122, in a down and to the right direction as indicated by the arrow labeled F, the structure 120 can move to a final position 120' or any position in between. The resulting final position of structure 122' is a result of two types of motion, rocking and slipping, as described in the next three figures.

Figure 2:
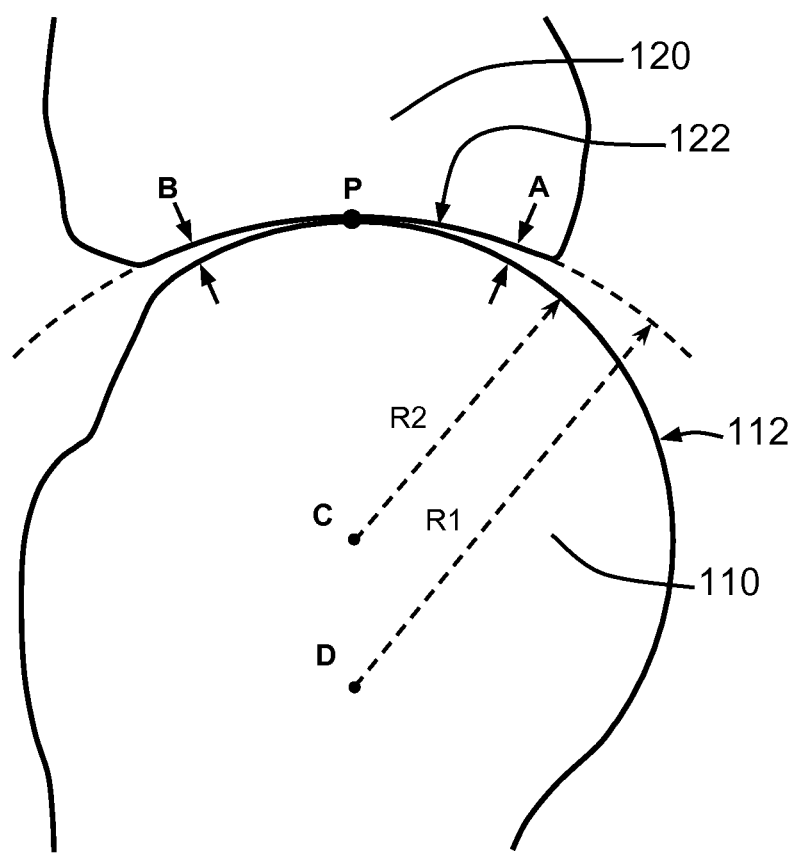
FIG. 2 is a view of a single lobe joint with two curvatures before motion.

FIG. 2 is a close up view of FIG. 1, before a moving force is applied, and showing details of the convex surface 112 and concave surface 122. The average radius R2 of the convex surface of 112 of the structure 110 is significantly smaller than the average radius R1 of the concave surface 122 of structure 120. R2 is preferably on the order of 60% smaller than R1, especially in many single lobe anatomical robot joints that are going to be designed to have a large range of motion. The convex surface 112 and the concave surface 122 may or may not have exactly round shapes, but their centers of curvature can be approximated at point C and point D respectively.

The point P is the contact point. Geometrically, point P is a single point where the tangents of the convex surface 112 and the concave surface 122 meet. Mechanically, with compliant materials, the contact would not be a single point, but rather a small area of contact, where point P is the average center of that contact area. The two gaps indicated by A and B on opposite sides of contact point P are a result of the differing radius of curvatures of the convex surface 112 and the concave surface 122.

Figure 3:
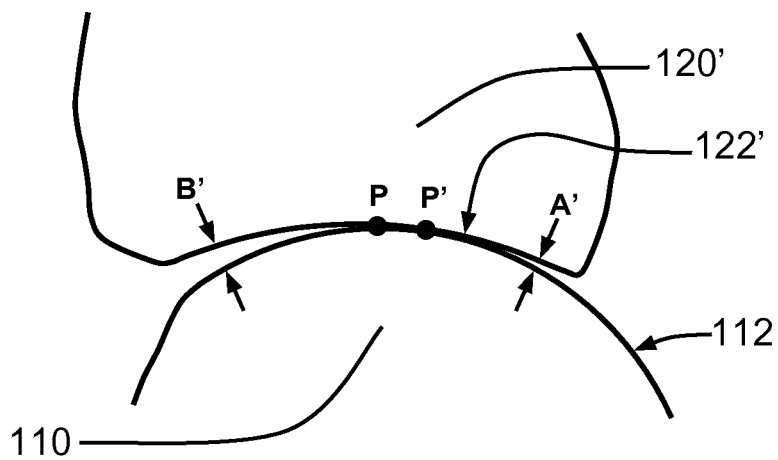
FIG. 3 is a view illustrating rocking type of motion.

FIG. 3 shows the rocking type of motion as a result of an external force moving structure 120 to a new position relative to structure 110. The rocking type of motion rotates around point P. The two surfaces 122' and 112 are frictionally engaged. Gap A' decreases and gap B' increases. The center of rotation, for an infinitesimally small amount of motion, is point P. The new point P' is a result of the contact area changing. With compliant materials, point P and point P' are average centers of a contact area. With a small change of position, some of the surface area with P stays the same as with P', and some of the surface areas change.

Figure 4:
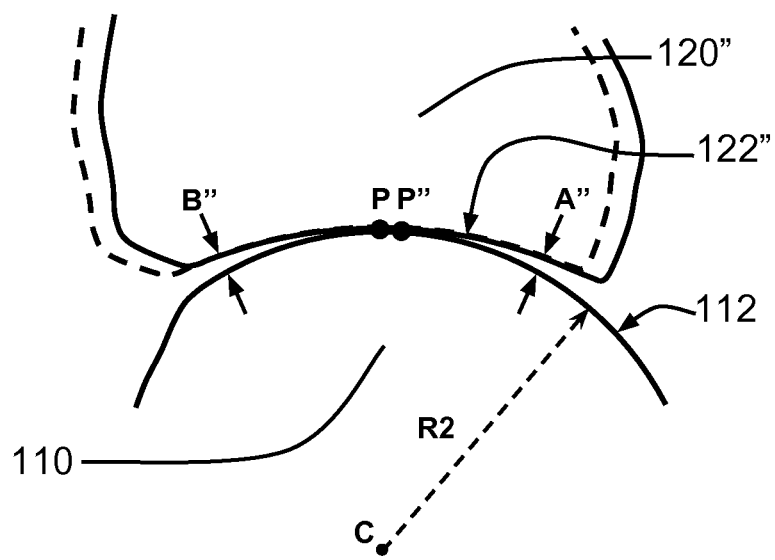
FIG. 4 is a view illustrating slipping type of motion.

FIG. 4. shows the slipping type of motion as a result of an external force. The old position of the structure 120, before the slipping type of motion, is indicated with a dotted line. In the new position, the concave surface surface 122" of structure 120" slides past the convex surface 112 of structure 110, essentially horizontally, from left to right. Point P has moved slightly to the right to a new position indicated by P". If the new point P" remains tangential to the concave surface, then gaps A" and B" remain at approximately the same gap space, and the center of rotation C for the slipping type of motion has an average radius of curvature R2.

In summary, there are two types of motion that can result from a force applied to structure 120. The first type of motion is a rocking motion around point P. The second type of motion is a slipping motion with the center of rotation at point C. These two types of motion can occur simultaneously and independently. It is difficult to ascertain whether the center of rotation is around P, or around C, or somewhere in between. Loading on the surfaces and friction at point P will ultimately determine where the exact center of rotation is. And this center of rotation will most likely change during the motion and depend on loading and other factors.

Many scientific anatomical experiments with cadavers have difficulty in determining exactly where the center of rotation is in a human joint. There is no exact center of rotation. And this is just one reason why many robot computational or constructed models of biological anatomical joints, that use a single axis that define the center of rotation precisely, are not exactly representative.

There is also an efficacy of the single lobe anatomical joint by which static friction or stiction is overcome because the rocking type of motion described is independent of friction or stiction. The rocking type of motion is the first to happen during the initiation of a force, followed soon after with the slipping type of motion once the dynamic properties of the surface friction are initiated. A mechanical ball joint does not have any rocking type of motion and does not have this advantage.

The shapes of the structures 110 and 120 are inspired by the metacarpal and proximal phalange of a human, however, the exact shapes of the structures are inconsequential to the invention. Any number of shapes or sizes, either biologically-inspired or not, can be used for the structures in this invention. It is essential to the invention, however, that the shapes allow rocking and slipping types of motion.

It is not necessary to this invention that the concave surface moves relative to a stationary convex surface. The roles can be switched. The same principles apply if the convex surface is moving relative to a stationary concave surface.

Also the contours of the articulating surfaces 112 and 122, one being convex and the other being concave, respectively, can vary by a large degree. It is not necessary that they be perfectly round. In fact, the articulating surfaces in a biological joint are seldom, if ever, exactly round. Biological joints do have the similarity with the anatomical robot joints in this invention, however, in that the convex articulating surface is significantly less in curvature, on average, than the articulating concave surface.

The convex surface being approximately 60% smaller than the concave surface in average radius of curvature is a non-obvious aspect of the invention because it is a radical departure from the exacting precision demanded by the bore and axle diameters of a conventional revolute joint. The convex surface of the axle is typically less than 1% smaller than the concave bore. For what the machinist or mechanical engineer want from a revolute joint is an exactly precise rotation around a solitary axis which defines an exact path for the structure movements, regardless of load, and that the surfaces do not wear as much as a less precise revolute joint, and if the surfaces do wear, they wear evenly. The anatomical robot joint with its radius of curvature disparity, is a novel and non obvious invention, with its advantageous not fully understood until one examines the strength, compliancy, design adaptability, and less stringent precision requirements.

Figure 5:
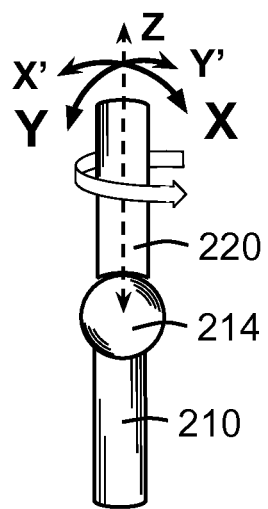
FIG. 5 is a view illustrating twisting type of motion.

FIG. 5, in contrast to the biological inspired shapes, shows geometrically simplified shapes that can be easily machined, drawn, and computer simulated. The essential invention, having a concave surface in contact with a convex surface with significantly reduced curvature, is still the same. The functionality and illustration of the rocking type of motion and the slipping type of motion is the same as with the anatomically-inspired shapes.

A twisting type of motion around the long axis Z of structure 220 is also indicated by the wide arrow. Twisting type of motion is the third type of motion described by this invention that complements rocking type of motion and slipping type of motion. The spherical ball 214 is fixed rigidly on top of a cylindrical stem 210. All three types of motion can occur independently. Another cylindrical stem 220 has a concave shape at the bottom, serving as the contact surface, with a radius of curvature significantly greater than the spherical ball 214. This single lobe anatomical robot joint can exhibit rocking and slipping types of motion in two dimensions, as shown by the X'X axis and the Y'Y axis, and depending on the direction of forces being applied to the structures.

Human anatomical analogs of a single lobe anatomical robot joint include the metacarpophalangeal joint, the radiohumeral joint, the shoulder joint, and the hip joint. The twisting type of motion is called rotation in anatomical lexicology.

In no way should the simplicity of the shapes shown in FIG. 5 limit this invention because many functional modifications and efficiencies can be obtained by modifying the basic concave and convex shapes. Within the framework specified by the claims of this invention, in that the anatomical robot joints are designed to allow rocking, slipping, and twisting types of motion, there are considerable design options as to the exact shape of the surfaces and the deployment of support element and flexible bands to create a wide variety of joints with unique functions and advantages.

The head of the human metacarpal is not exactly spherical, varies from person to person, and varies from index finger to little finger on any one person. The head is a bit more pointed at the top. This, with collateral ligaments that are slightly loose, allow the side to side motion that allows one to spread the fingers. And as the fingers grip, the convex surface becomes slightly wider and the collateral ligaments become tighter, stopping the fingers from spreading when the hand is fully clenched. These are morphology features that robot designers may or may not want in their designs. All these slight enhancements to the final shapes should be considered if one is designing for anatomical exactness or for some other design criteria or function.

Figure 6:
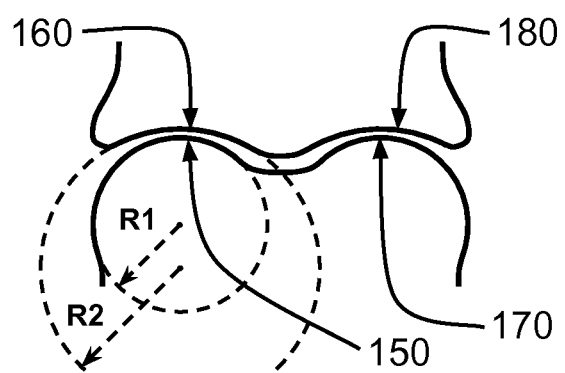
FIG. 6 is a view of a double lobe joint.

FIG. 6 shows a cross sectional view of a double lobe anatomical robot joint which has double concave and double convex surfaces. It is as if two joints with the single lobe shape were put side to side. The motion in one dimension is unrestricted but the motion is limited in the other dimension. A double lobe joint is useful in an anatomical robot designed to mimic the functionality of a human wherever a single degree of freedom is desired, such as the knee or the interphalangeal finger joints.

The contacting convex surface 150 has a curvature R1 that is significantly less, on the order of 60% less, than the analogous mating contacting surface 160 with a radius of curvature R2. The radius of curvature of contacting convex surface 170 is significantly smaller than the radius of curvature of contacting convex surface 180 and does not necessarily have to be the same as R1 and R2.

Figure 7:
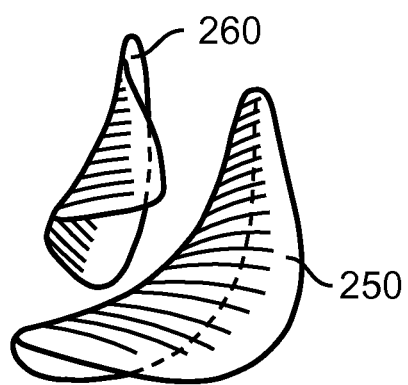
FIG. 7 is a view of the two contacting surfaces of a saddle joint.

FIG. 7 shows the two contacting surfaces of a saddle anatomical robot joint. The longer dimension of contacting surface 250 has a concave shape. The shorter dimension of contacting surface 250 has a convex shape. The underside contacting surface 260 can exhibit rocking, slipping, and twisting types of motion over contacting surface 250. The twisting type of motion is somewhat limited due to the geometries. The convex shape in either dimension has a curvature that is significantly less than the curvature of the corresponding concave surface. The trapeziometacarpal joint of the thumb and the sternoclavicular joint are analogous saddle joints found in the human body.

Figure 8:
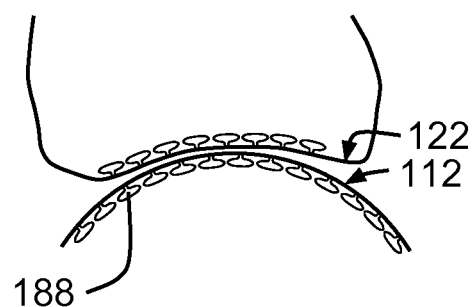
FIG. 8 is a view of a contacting surfaces with lubrication recesses.

FIG. 8 is a close-up view of convex surface 112, concave surface 122, and how these contact surfaces can be modified to allow automatic lubrication. The contacting surfaces are populated with numerous small or microscopic recesses 188 that are filled with a lubricant. Given that the surfaces are slightly compressible, or perhaps just the motion of the surfaces moving past each other, makes the lubrication ooze onto the surfaces, reducing friction, and aiding the slipping and twisting types of motions. Rocking type of motion depends on friction.

It should be obvious that sufficient lubrication might be obtained with only one of the surfaces having these lubrication recesses. It should also be obvious that the lubrication recesses could possibly all be interconnected to a central reservoir or pump of lubrication. And, of course, the exact shape and size of the recesses can be varied for best performance.

Depending on the design and possible use, an anatomical robot can have flexible envelopes surrounding and enclosing any number of contacting surfaces to keep the contacting surfaces clean and optionally so that a lubricating fluid may be inserted and retained in the areas between the contacting surfaces.

Figures 9, 10:
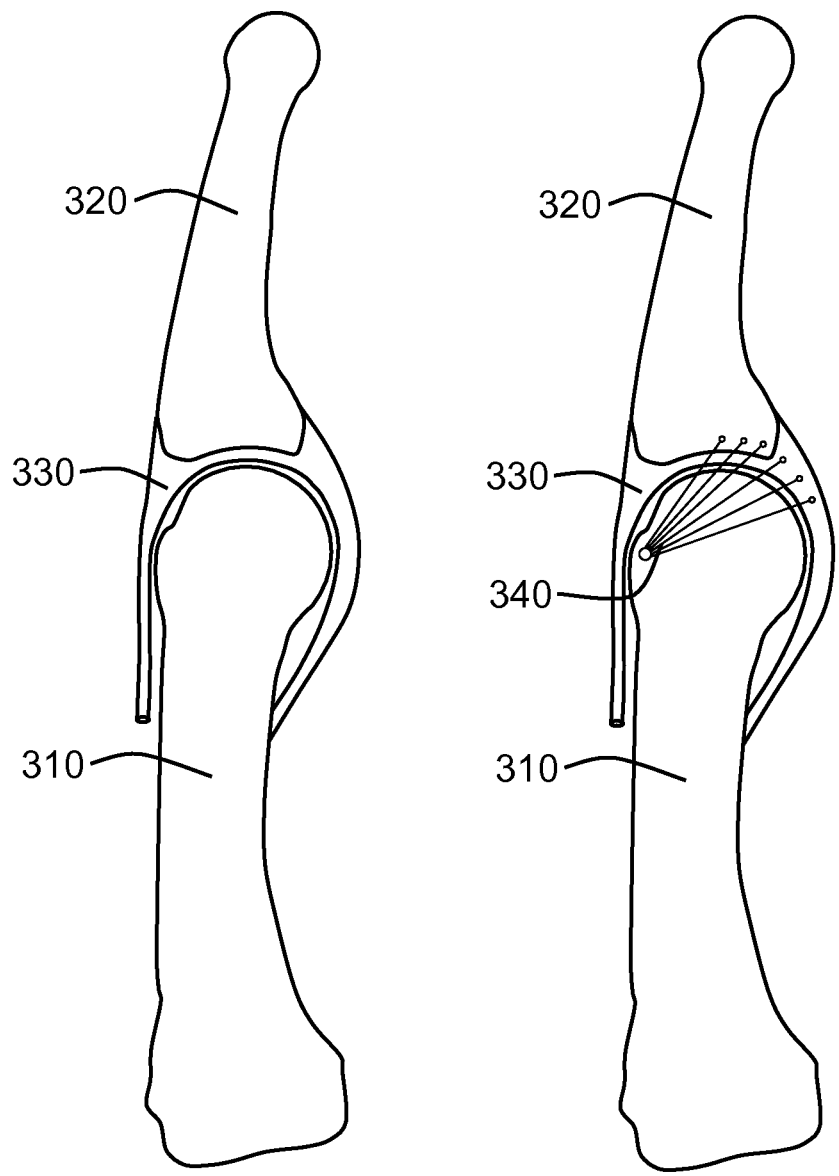
FIG. 9 is a view of an anatomical robot joint with support element.
FIG. 10 is a view of an anatomical robot joint with bands in position 1.

In FIG. 9, support element 330 has been attached to structure 320 in order to increase the surface contact and thereby the stability of the anatomical robot joint. The support element 330 wraps to both the left and right sides of the structure 310, and attaches underneath structure 320, and provides a softer surface with less friction for the slipping type of motion and the twisting type of motion described in earlier figures.

Without a support element the area of the concave contacting surface is smaller in angle than the included angle of the convex surface. This can result in a bit of instability. In the human body, joints with relatively large ranges of motion are often encompassed with softer tissue that effectively increases the surface areas of the articulating surfaces, especially the concave articulating surfaces. These tissues can be approximated in an anatomical robot by choosing materials with a softer durometer and attaching them to the stiffer material employed in the structures.

The right side of support element 330 can attach to the structure 310 to restrict the structure 320 from bending backward to the left. The left side of support element 330, analogous to the central extensor in a human hand, would typically connect to a prime mover or to a passive spring system.

It is not a limitation to the invention that the support element 330 must be added to the joint to make it function. With the proper choice of artificial materials, and/or changes to the shapes of structures 310 and 320, a functioning joint can be fashioned without the support element and with less cost. The addition of support elements, however, can add extra stability.

If the objective is to model the human anatomy as closely as possible, then it becomes a necessity to include a support element of the joints of the anatomical robot. Also the support element must be of a softer material than the structure material, and one that affords less friction. The support structure can also have small recesses for lubrication.

FIG. 10 shows flexible bands 340 that hold support element 330 and structure 320 in proximity to structure 310. These bands emanate from the side of structure 310 and connect to structure 320 and to support element 330. The bands 340 emanate from a point to the left of the center of curvature. Conventional engineers might mistakenly place these origins at the center of curvature. But this leads to an undesirable cogging as the front of structure 320 is pulled down. In most human joints with a large range of motion, the analogous ligaments run obliquely (not perpendicularly) to the approximate axis of rotation.

Figure 11:
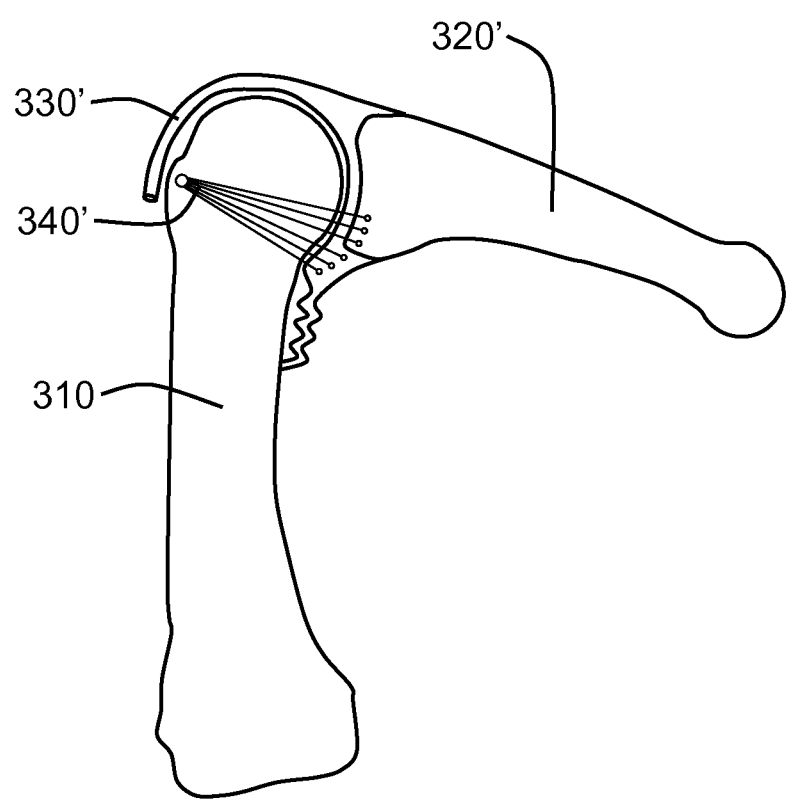
FIG. 11 is a view of an anatomical robot joint with bands in position 2.

FIG. 11 shows structure 320' after moving to a new position relative to structure 310. Flexible bands 340' and support element 330' have moved and changed shape to accommodate the new position. In an anatomical robot, the flexible bands can be monofilament string, braided string, molded flexible material, glass fiber, rubber, or any other suitable material or combination of materials.

An inherent advantage of an anatomical robot joint is strength. In a conventional revolute joint design, two cylinders of similar diameter to be coupled are formed with a flat or a slot in one cylinder, and a mating flat in the other. The flats decrease the cross-sectional area and reduce the strength of the cylinders by at least half. The strength can be further reduced by the bore machined to accommodate the pin or axle. Also, the contacting surfaces have no inherent means to clear debris.

Anatomical robot joints do not have these inherent weaknesses. The structures do not have half their cross-sectional area removed. There is no bore for a pin or axle. The structures are held together with flexible bands that can have much higher tensile strength than comparable yield strength of pins or axles. Any debris in an anatomical robot joint is wiped clean with every motion.

Without flexible bands, a single lobe anatomical robot joint can move with rocking type of motion in two degrees of freedom, slipping type of motion in two degrees of freedom, and twisting type of motion. All of these independent types of motion and degrees of freedoms can occur independently of each other and at different simultaneous rates. The addition of flexible bands, not only hold the contacting surfaces together, but also place limitation on the range of motion of each degree of freedom and on the the twisting type of motion.

Figures 12A, 12B:
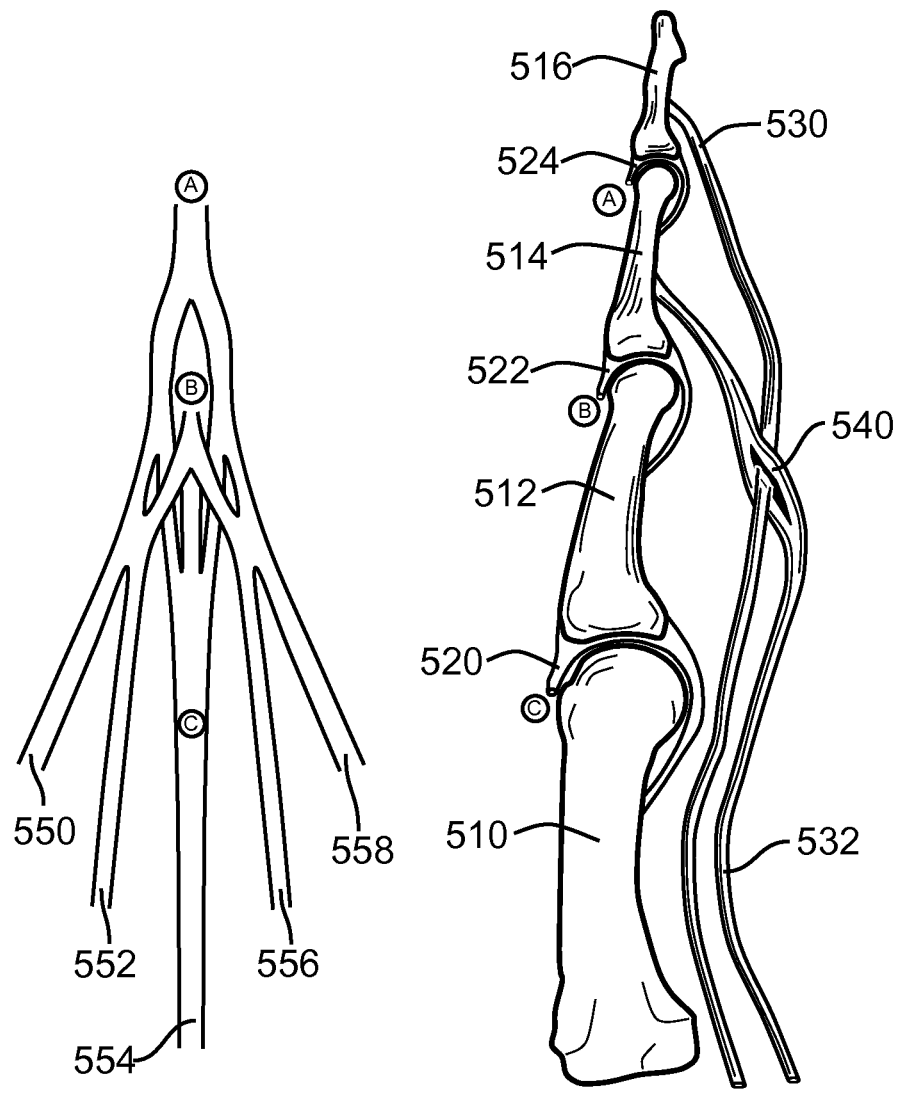
FIG. 12A is a view of an anatomical robot digit with pull cords.
FIG. 12B is a view of an anatomical robot digit extensor webbing.

FIG. 12A shows an anatomical robot digit comprising structures 510, 512, 514, and 516. Structure 510, analogous to a metacarpal, is enclosed in a palm enclosure (not shown), preferably one that is flexible for better grasping. Not that it is essential to this invention, but if modeling the human hand is a priority then structure 510 would have a distal single lobe convex surface forming a single lobe anatomical robot joint, and structures 512 and 514 would have distal double lobe convex surfaces forming double lobe anatomical robot joints. Flexible support elements 520, 522, and 524 further expand the concave contact surfaces and add stability.

Pull cords 530 and 532 are flexible materials which are connected to prime movers (not shown) that pull the structures, for flexing or gripping. These pull cords are constrained by straps in such a way that allows the anatomical robot digit to flex without the pull cords moving far from the surface of the structures.

It may be optional for an anatomical robot, but the slit 540 in cord 532 that allows pull cord 530 to pass through illustrates an analogous and interesting biological adaptation in human anatomy. In a comparison of the anatomical robot to its human analog, pull cord 530 is analogous to the Flexor Digitorum Profundus (FDP) and pull cord 532 is analogous to the Flexor Digitorum Superficialis (FDS). The evolutionary advantage of the FDS bifurcating into two slips to surround the FDP, is a matter of some debate. The word superficialis implies that the FDS runs closer to the surface of the skin. It is more exposed to attack. Since the FDP is essential for gripping objects firmly, less so than the FDS, there is an advantage in terms of survival in combat. Another theory is that the FDS gets more leverage by running over the FDP. And yet another theory is that the FDS stabilizes the FDP running through it. Any theory about the functions on a human can be studied and applied to an anatomical robot.

FIG. 12B shows a view of a force distribution webbing, analogous to the extensor expansion of a human finger, to return the digit back to an open extended position after flexing or grasping. Pull cords 550, 552, 554, 556 and 558 couple back to prime movers that initiate extension.

The letters A, B, and C in FIG. 12A and FIG. 12B indicate the general locations where the distribution webbing is attached to the anatomical robot digit. To visualize how the webbing works, FIG. 12B is rotated 90 degrees counterclockwise along a vertical axis down the center of the figure, (the webbing rotates out of the plane of the paper) so points A, B and C of FIG. 12B attach to point A, B, and C of FIG. 12A. The rest of the webbing wraps around the structures so that pull cords 550 and 558 of FIG. 12B are close to pull cords 530 and 532 of FIG. 12A.

A variety of materials can be used for the webbing, including, but not limited to, rubber, braided Nylon™, monofilament Nylon™, braided Spectra™, two part castable polyurethanes and two part castable silicones, glass fiber, or any combination of these. These materials can be attached with screws, glues, or knots, with or without tiny holes drilled for more secure attachment. Thermoplastics, rubbers, silicones, polyurethanes, metals, and various other materials can be used, especially if higher volume production is economical.

Figure 13:
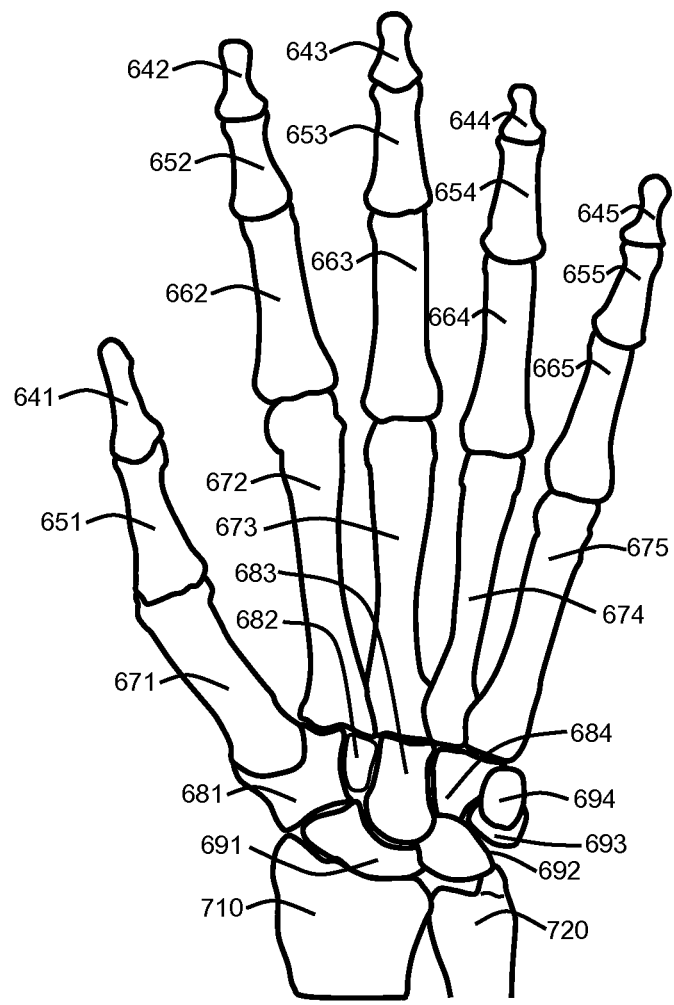
FIG. 13 is a view of an anatomical robot hand.

FIG. 13 shows an anatomical robot designed to resemble a human hand. A thumb and four digits are constructed in similar fashion to the anatomical robot digit in FIG. 12B. The thumb and four digits are coupled to a wrist complex comprising smaller structures, analogous to carpal bones in a human wrist. These smaller structures are then coupled to longer structures (partially shown), analogous to the radius and ulna in a human forearm. It is not limiting to the invention that the structures resemble human form.

Double lobe anatomical robot joints couple structures 641 to 651, 642 to 652, 643 to 653, 644 to 654, 645 to 655, 652 to 662, 653 to 663, 654 to 664, and 655 to 665. A single lobe anatomical robot joint couples structures 651 to 671, 662 to 672, 663 to 673, 664 to 674, and 665 to 675. The flexible bands, support elements, and pull cords are not shown.

The structures of the first row 681, 682, 683, and 684 are held together by flexible bands that provide some flexibility, but not nearly as much as provided by the aforementioned anatomical robot joints. It should be pointed out that the structure 683, analogous to the capitate carpus, has a comparatively large spherical shape at the proximal end. This incorrectly suggests a ball and socket as a possible mechanical replacement where the center of rotation is at the center of the ball. But empirical evidence from CT scans and a study of ligaments of the human hand indicate that in an anatomically correct anatomical robot, the center of motion is around the rectangular distal head of structure 683, and not at the center of the proximal sphere shape.

The structures of the second row 691, 692, 693, and 694 are far more mobile, and tend to move around structure 683 and within the concave surfaces at the distal ends of structures 710 and 720, analogous to the radius and ulna. Structure 691, analogous to the scaphoid carpus, is the most mobile, and exhibits a large degree of rocking, slipping, and twisting types of motion in respect to the structures, especially structure 683 and structure 710. Structure 691 moves out from underneath and up the side of the structure 683 in order to offer a supporting column from structure 710 to structure 681, as an anatomical robot wrist moves to the right.

A human wrist is a very complicated, multi-boned, multi-articulating-surface, joint complex. The only thing that is clear is that all the convex articulating surfaces are less in average curvature than their corresponding articulating concave surfaces and that everything is held together with ligaments.

Figure 14:
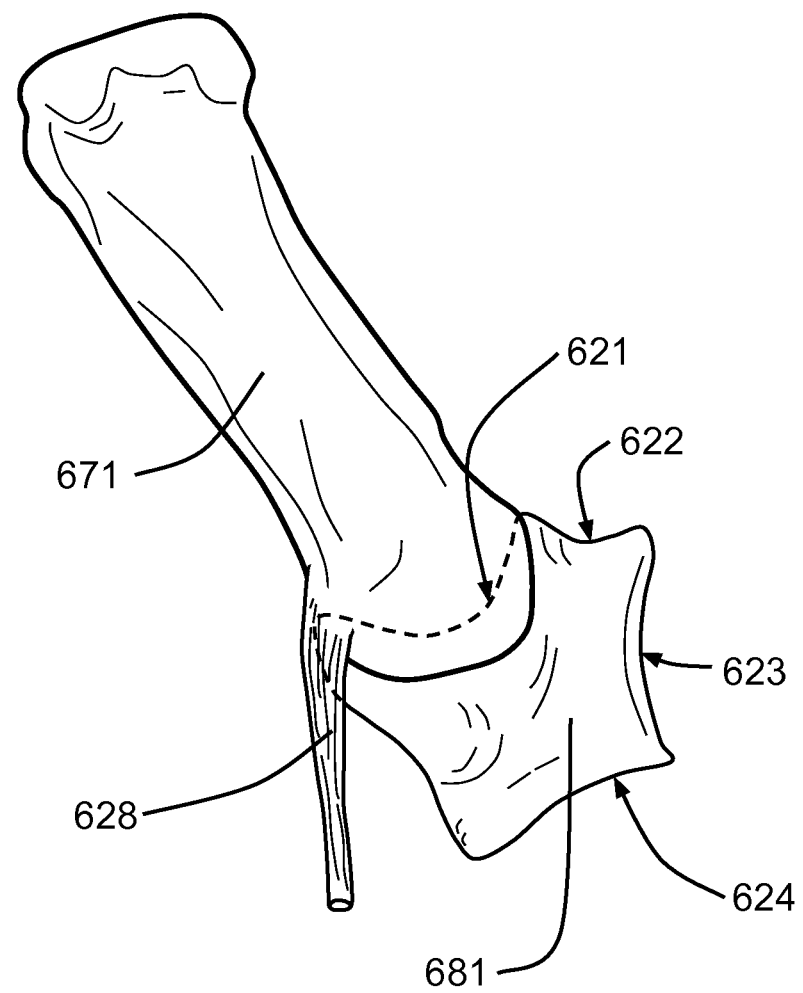
FIG. 14 is a view of an anatomical robot thumb metacarpal and trapezium.

FIG. 14 shows an anatomical robot analogous to the metacarpal and trapezium of the human thumb. As stated before, it is not a requirement for an anatomical robot to follow the form of a human. However, if the designer is trying to do this to meet some requirement, like building an anatomical robot for kinesiology studies, then an exact shape replication, or near-replication, may be necessary.

A saddle anatomical robot joint couples structure 671, analogous to the first metacarpal, to structure 681, analogous to the trapezium. This saddle anatomic robot joint allows two degrees of freedom. The shape and the orientation allow an anatomical robot thumb to move into opposition to the anatomical robotic digits.

First, there is a rocking type of motion and a slipping type of motion along the convex surface of metacarpal structure 671 as it moves relative the concave surface of structure 681. The direction of these types of motion is basically in the plane of the paper. The top of structure 671 moves downward in the plane of the paper while the bottom stays in contact with structure 681.

Second, there is a rocking type of motion and a slipping type of motion along the concave dimension of structure 671 as it moves relative the convex surface of structure 681. The direction of these types of motion is basically to make structure 671 come out of the plane of the paper at about a 35 degree angle.

This angle is important. It does not have to be exactly 35 degree angle but It should not be 90 degrees, as some traditional robot designers carelessly mount the thumb to obtain opposition. Opposition is good, but a 90 degree mount severely changes the angle by which the tip of the robot thumb touches the tips of the other digits of the robot hand, adversely affecting many human-like grips.

The contacting surfaces of 681 are analogous to the articulating surfaces of a human hand. Surface 621 (dotted line) demarks the contact profile between structure 671 and 681. Surface 622 contacts with a structure analogous to the second metacarpal, surface 623 contacts with a structure analogous to the capitate, surface 624 contacts with a structure analogous to the scaphoid.

There is a theory in human anatomy that tendons that insert into the base of a distal bone tend to support a joint where a convex surface is being pulled over a concave surface. This theory is demonstrated here, in an anatomical robot, as pull cord 628, analogous to the abductor pollicis longus, is attached to structure 671 very close to the contacting surface and pulls the convex surface of structure 671 over the concave contacting surface of 681. The other tendons acting on a human thumb attach distally to thumb phalanges. The advantage may be entirely in the wear patterns of the anatomical robot joint surfaces.

Figures 15A, 15B:
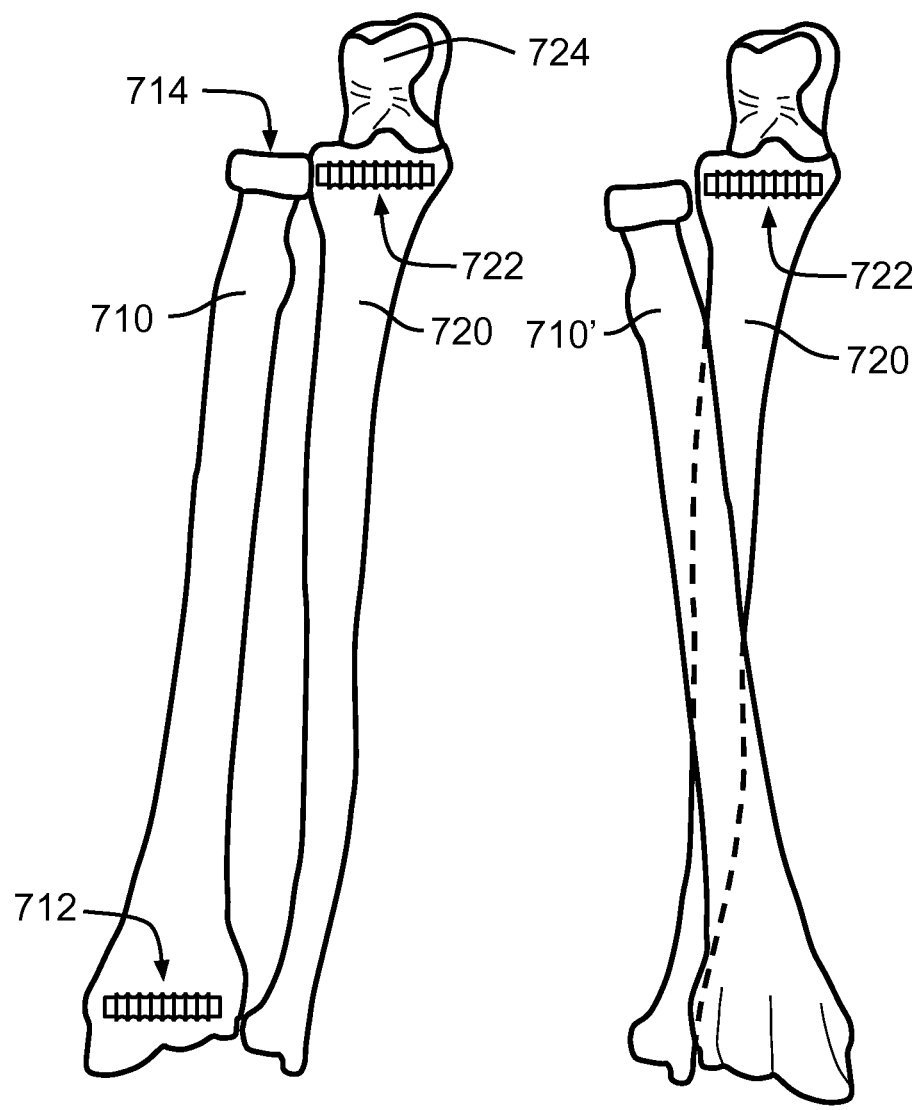
FIG. 15A is a view of an anatomical robot forearm in position 1.
FIG. 15B is a view of an anatomical robot forearm in position 2.

FIG. 15A show two structures 710 and 720, analogous to the radius and ulna, found in the forearm between the elbow and the wrist. Contacting surface 724 and contacting surface 714 couple to one upper arm structure (not shown). The supinated position is shown, which is the position analogous to a person holding the elbows close to the body, the forearms out straight, and the palms facing up, as if to carry something.

FIG. 15B shows the same structures 710' and 720 in the pronated position. Again with the elbows close to the body, the forearms out straight, but this time with the palms facing down. In this pronated position, the distal end of structure 710' moves over the top of structure 720. An anatomical hand, if connected to structure 710', is now positioned with the palms facing downward.

Contacting surface 724 can be considered a saddle joint in that it has a concave shape, from top to bottom, and a convex shape, from side to side. However, no anatomical references refer to the analogous humeroulnar joint as being a saddle joint, probably because it does not have two degrees of freedom, as most saddles joints do, being inextricably coupled to the humeroradial joint. The humeroulnar joint is usually called a "hinge joint" in anatomical references, a very misleading term.

An anatomical robot forearm based on human anatomy is an innovative departure from the majority of robot designs, which usually replace wrist rotation with a revolute joint, placed in the wrist or forearm, with an axis of rotation approximately down the center of the forearm. These designs, while able to put the robot hand or gripper into any position comparable to a human hand, can be at a disadvantage when the forearm is used to help carry objects, like carrying textbooks against the chest, for example.

Another advantage of the anatomical robot forearm is that a set of pulleys 722 can be attached to the proximal surface of structure 720, and a receiving set of pulleys 712 attached to the distal end of structure 710. These pulleys can be used to transmit mechanical motion to the hand via pull cords with the advantage of less tangling than with a conventional revolute forearm and wrist design. Although these rows of pulleys are not analogous to the human forearm, they can help a designer in a hybrid design to transfer weight off the forearm.

Another advantage of an anatomical robot forearm is that the angle of structure 710, as it hangs from the elbow joint, varies as it moves between the pronated and supinated positions. One might notice this advantage when carrying heavy buckets at the side of the body, that if one rotates the palms to face forward, the buckets naturally hang slightly away from the body, making it easier to walk, without banging one's legs against the buckets.

Figure 16:
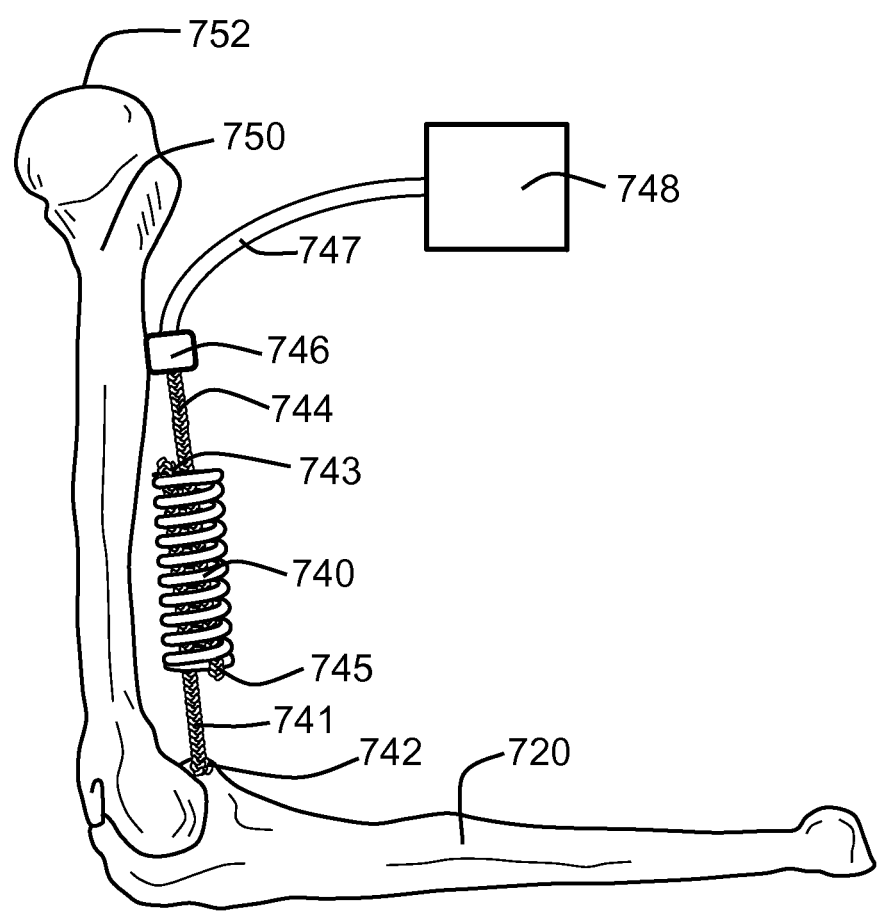
FIG. 16 is a view of an anatomical robot upper arm.

FIG. 16 shows an upper arm structure 750, analogous to a humerus bone of a human; a forearm structure 720, analogous to an ulna bone of a human; and motion driving elements. Surface 752 of structure 750 contacts a surface analogous to the glenoid cavity of the scapula of a human. That said, an exact replication of the human form is not necessary to the invention.

Spring 740 has two pull cords running through its center. Pull cord 744 is attached by a knot 745 to the bottom of spring 740, runs up through the center of spring 740, then runs through a mounting block 746 and through conduit 747 to mechanical pulling mechanism 748. Pull cord 741 is attached to structure 720 with knot 742, passes up through the center of spring 742, and attaches to the top of spring 740 with knot 743. When pull cord 744 is pulled by pulling mechanism 748, the bottom of spring 740 rises, putting spring 740 in compression, and exerting a force on and thereby moving structure 720 via pull cord 741.

Spring 740 decouples the driving force from the load. Inertia from the kinetics of the drive, like gear inertia, or any amount of friction from the cabling, is decoupled. Moving the pulling mechanism 748 off the anatomical robot upper arm can also have the tremendous advantage of reducing the mass of the moving structure.

The spring 740 is a compression spring, rather than an extension spring, to make it perfectly obvious that the spring could be replaced with a compliant material that could look more like a human muscle. It should be obvious to anyone skilled in the art, that a simple replacement of spring 740 with a squishy material and pull cords that go through the center, or wrap around the outside, can put the material into compression, and act like a compression spring.

In some robotic designs, a force presented by spring 740 acting in a flexing direction is complemented by another force acting in an extension direction. Two forces acting antagonistically allows for adjustment of the stiffness of the joint as well as the position of the structure. This is indeed a desirable design feature. A robot designer could place another compressible spring on the opposite side of structure 750 and obtain active extension. A squishy material in compression bulges, which makes it look more like a muscle flexing than a stretched elastic material.

The elbow joint with two opposing muscles is often cited in robotic and kinesiology literature to stress the idea of antagonistic muscle pairs within the human body and purported to be an important design criteria for biologically inspired robotics. But this is an over-simplistic notion. For, in fact, in the human body, no two muscles completely define the motion of any one joint. For one thing, many muscles in the human body, in conjunction with their tendons, act on bones that are two or more joints away. And, many tendons attach at multiple bones. Even for the relatively simple elbow joint, for example, the bicep muscle originates from two areas on the scapula and terminates on both the radius and the ulna. These complexities, which are difficult for most engineers to understand, offer a considerable amount of stabilization. A robot designer should not assume that two opposing actuators for every degree of freedom is necessarily the best solution.

Figure 17:
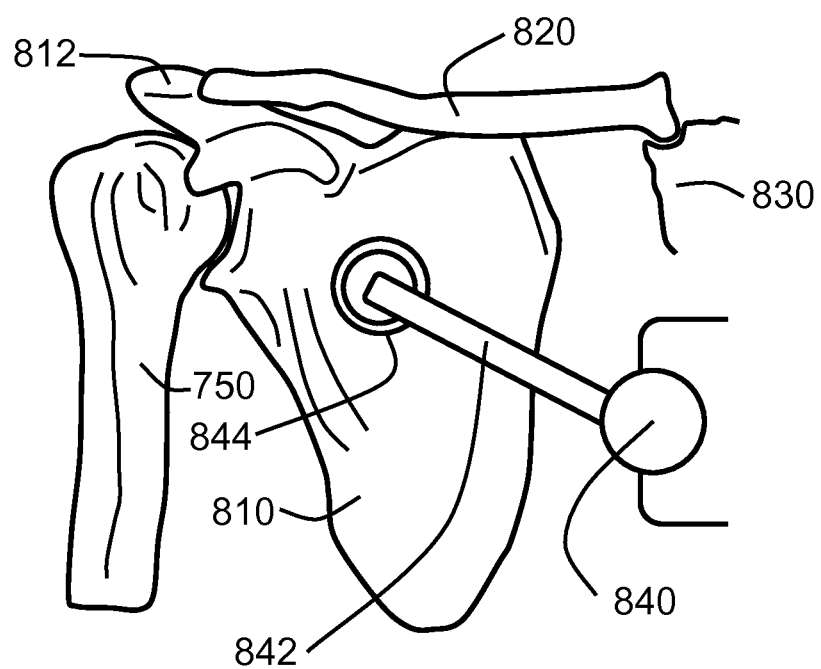
FIG. 17 is a view of an anatomical robot shoulder girdle.

FIG. 17 shows an anatomical robot designed in accordance with the human shoulder girdle. Structure 750, analogous to the humerus, couples with a single lobe anatomical robot joint to structure 810, analogous to the scapula. Structure 810, at a protuberance 812, analogous to the acromion, couples with a single lobe anatomical robot joint to structure 820, analogous to a clavicle. And structure 820 couples with a saddle anatomical robot joint to structure 830, analogous to the sternum. Structure 830 is essentially attached to the main body of the anatomical robot.

Instead of an artificial ribcage, the motion of the structure 810 is further enabled with ball joint 844, linkage 842, and another ball joint 840, and is restricted with pull cords and flexible bands (not shown).

In human anatomy, one finds that part of the scapula is held in place by a joint connecting it to the collar bone, also called the clavicle. This then defines a linkage movement for the scapula. The rest of the motion is determined from the underside of the scapula gliding over the rib cage. There are muscles in between the two surfaces, unlike any other joint in the human body. The scapular motion over the ribcage cannot be modeled with the one lobe, two lobe or saddle joints that have been discussed so far. A considerable amount of mobility, however, is gained through this motion, which is often neglected by roboticists who simplify their design by attaching three or four revolute joints to a solid body frame.

There are advantages and disadvantages of constructing the shoulder girdle with conventional linkages. One advantage is that the position can be more accurately controlled. Another advantage is the position can be more accurately measured with instrumentation. Additionally, the geometries of the linkages are easier to understand and to compute.

In many robots built to resemble human form, the arms are typically attached to the main body with three separate revolute joints. The axes of these revolute joints intersect, or are clustered closely together, so as to mimic the functionality of a three degree of freedom human shoulder joint. To some extent, this representation is advantageous, especially in heavier industrial applications, or applications that are going to undergo a great deal of wear and tear. Most of these revolute shoulder designs neglect the mobility enabled by the human shoulder girdle.

Hybrid designs can also introduce disadvantages. For example, without the shape of the rib cage, it is difficult to ascertain in what way the muscles that attach to the scapula should be attached. And it is also difficult to understand or model the effect of the wrapping of the muscles as they move the scapula over the ribcage.

A hybrid design, combining the anatomical approach with conventional approach, can provide advantages in almost any part of the anatomical robot, but, inevitably also introduce disadvantages as well. A person well-versed in the art should be able to choose the optimal combination to fit any particular application.

In summary, what has been shown in this invention is a basis for building an anatomical robot arm, from digits to shoulder, with anatomical robot joints. It should be obvious to one skilled in the art that anatomical robot legs could be built with the same approach. The results can be anthropomorphic, but this is not essential to the invention. Also, one skilled in the art can animate the robot with actuators controlled by computers or with ingenious mechanical drives.

An important advantage of the anatomical robot joint is the advantage of high strength. All the structures are held together by flexible bands. These bands can be reinforced with, among others, Kevlar, glass fiber, or Spectra fibers yielding incredible strength. The structures themselves do not need to be divided into two or more parts in order to pass an axle or pin from one part to the other and so are inherently stronger.

Throughout this invention, there are several specifications on how to best model human anatomy. This should not be considered a limitation to the invention. Modeling human anatomy may or not be useful to the any one robotic designer. There may be efficiencies in wheeled robotic bases instead of legs, or three digit hands, or any number of modifications to the human form. The roboticist may even be modelling a different species. Even if the objective is to study the human form, there may be design issues that require different approaches. A roboticist building a kinematic model for throwing a baseball, for example, will have a totally different set of design criteria than a roboticist building a human-like robot ballistic target for forensics.

If close adherence to human anatomy is observed, the anatomical robot can be a great educational and instructional tool for those wanting to study anatomy or kinesiology. Classes in anatomical robot building would be a stimulating and interactive supplement to today's cut-and-identify gross anatomy labs.

Many robot designs falter because of an excessive simplification or just a lack of interest in human anatomy. There are robot hands designed that can not grip like a human because of an orthogonal attachment of the thumb to the palm. And the palm itself are usually designed as an inflexible block that will, by design, have trouble grasping hand tools. Many other examples exist, such as wheeled robots not negotiating stairs. A fully anthropomorphic anatomical robot would circumvent these problems.

The anatomical robot could also be used in ballistics, forensic, military or crime scene reenactments. The anatomical robot could be used in sports kinesiology to test the breaking point or strain failure of certain sports related movements or analyze the relative effectiveness of one motion over another. The anatomical robot could be used as stunt doubles, stand-in actors, or crash dummies.

More than these specialized applications, however, it is the hope of the inventor that anatomical robot design will spur the growth of a new class of worker robots. That is, to design a robot that can be universally applied to any human work environment and can successfully accomplish any task that a human is able to do, such as, but not limited to, scrubbing, washing, sanding, digging, masonry, framing, roofing, gardening, pruning, weeding, harvesting, driving, or anything one might imagine. For if the robot can move exactly as a human can move, there only remains the daunting, but achievable goal, of controlling the motions, subject to sensory input, to perform all tasks that need to be done.

There is a mindset that accompanies this invention that would discard the conventional preoccupation with exacting mechanical structures and inordinately precise tolerance. Rather one should adopt the simpler and less precise, but compliant, structures analogous to human anatomy. The internal workings of most robots still consist of hinges, linkages, bearings, cables, gears, motors and other inventions of the industrial age. These have little anatomical equivalency within the human body and should be abandoned in an anatomical robot.

The interest in the knowledge of anatomy and kinesiology of humans, since the anatomical studies of the early renaissance artists until today, when the internal morphology of a living human body is probed with X-RAY, MRI, PET, and CAT scans, is expanding exponentially. There is, however, a rift between today's knowledge of anatomy and the application of that knowledge to the design of robots. More than just the joints, the robots today seem to reflect a sort of anatomical naivety, like a child's early stick figure drawings in comparison to, say, the elegant anatomical drawings of Leonardo da Vinci. When robot designers ultimately bridge this rift, many unexpected advantages will be discovered.

What is claimed is:

1. An anatomical robot including: at least a first structure element and a second structure element, at least a first compelling element and a second compelling element, and a pull cord system; each of said structure elements having at least a first contacting surface at a longitudinal end of said respective structure elements, said first contacting surface of said first structure element being one of concave or convex and said first contacting surface of said second structure element being the other of concave or convex and being proximate said first contacting surface of said first structure element and receiving said first contacting surface of said first structure element and forming a mating pair; each said compelling elements spanning between and connected to said first structure element and said structure element of said mating pair and compelling said contact surfaces to remain in contact; and said pull cord system including at least a first pull cord attached to said first structure element, and at least a first pull cord pulling device, said first pull cord and said first pull cord pulling device permitting flexing of said first structure element with respect to said second structure element.

2. The anatomical robot of claim 1 wherein with respect to said mating pair, said convex contact surface has less average curvature than said concave contact surface, said concave contact surface and said convex contact surface permitting a rocking motion with respect to said first structure element and said second structure element.

3. The anatomical robot of claim 2 wherein said compelling elements include flexible bands.

4. The anatomical robot of claim 2 wherein said mating pair form a single lobe anatomical robot joint, a double lobe anatomical robot joint, or a saddle anatomical robot joint.

5. The anatomical robot of claim 2 wherein said concave contact surface includes a flexible support element configured to increase an effective surface area of said concave contact surface.

6. The anatomical robot of claim 2 wherein said structure elements and said compelling elements are translucent.

* * * * *